April 5, 1966   E. A. ASH   3,244,932
SLOW WAVE STRUCTURE HAVING A PLURALITY OF CURVED CONDUCTORS
DISPOSED ABOUT THE BEAM AND MOUNTED TRANSVERSELY
BETWEEN OPPOSITE WALLS
Filed May 24, 1961   3 Sheets-Sheet 1
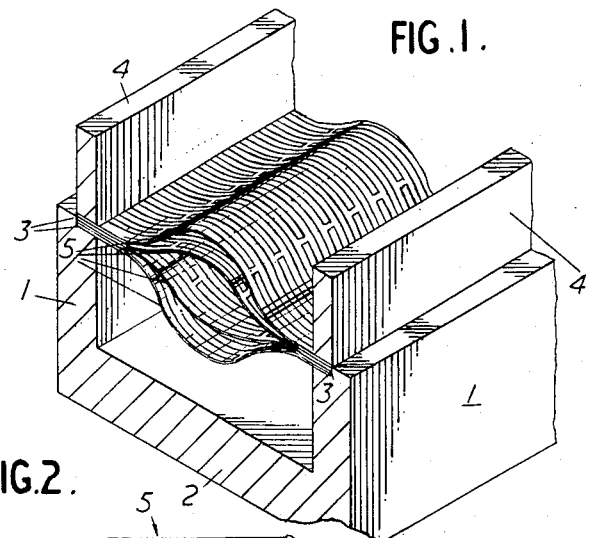
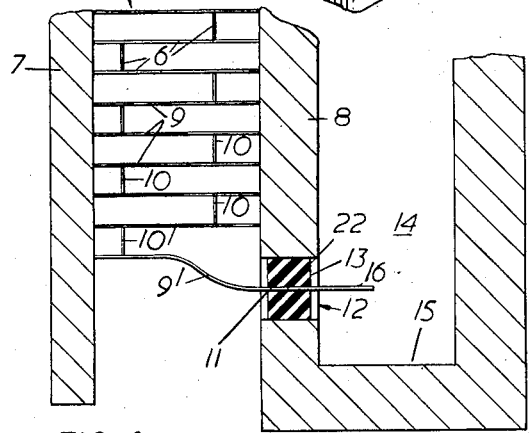
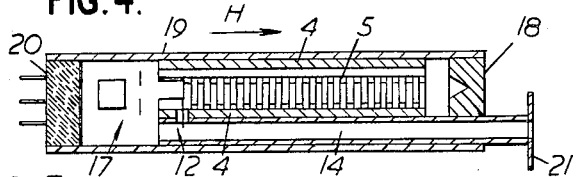
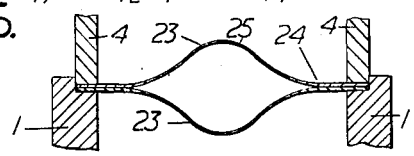
*Inventor*
ERIC ALBERT ASH
By *John J. Goodwin*
*Attorney*

April 5, 1966  E. A. ASH  3,244,932
SLOW WAVE STRUCTURE HAVING A PLURALITY OF CURVED CONDUCTORS
DISPOSED ABOUT THE BEAM AND MOUNTED TRANSVERSELY
BETWEEN OPPOSITE WALLS
Filed May 24, 1961  3 Sheets-Sheet 2

*Inventor*
ERIC ALBERT ASH
By John J. Goodwin
*Attorney*

April 5, 1966  E. A. ASH  3,244,932
SLOW WAVE STRUCTURE HAVING A PLURALITY OF CURVED CONDUCTORS
DISPOSED ABOUT THE BEAM AND MOUNTED TRANSVERSELY
BETWEEN OPPOSITE WALLS Filed May 24, 1961  3 Sheets-Sheet 3

Inventor
ERIC ALBERT ASH
By John J. Goodwin
Attorney

United States Patent Office 3,244,932
Patented Apr. 5, 1966

3,244,932
SLOW WAVE STRUCTURE HAVING A PLURALITY OF CURVED CONDUCTORS DISPOSED ABOUT THE BEAM AND MOUNTED TRANSVERSELY BETWEEN OPPOSITE WALLS
Eric Albert Ash, London, England, assignor to International Standard Electric Corporation, New York, N.Y., a corporation of Delaware
Filed May 24, 1961, Ser. No. 112,247
Claims priority, application Great Britain, June 3, 1960, 19,710/60
12 Claims. (Cl. 315—3.6)

The present invention relates to traveling wave tubes, which term is here taken to include backward wave oscillator tubes, and is especially concerned with slow wave structures and the method of making the same.

The present invention also relates to means for coupling a wave-feeder, such as a coaxial line or a hollow waveguide, to a slow wave structure of the kind in which wave propagation is supported over a band of frequencies by a grating of conductors arranged in a mesh or lattice pattern bounded by a pair of conducting side walls.

In order to increase the power output from a traveling wave tube, proposals have been made to use, in what is virtually a paralleled arrangement, more than one slow wave structure. Such structures may have portions common to one another, in which case the composite arrangement may be referred to as a multiple element slow wave structure. In a multi-element slow wave structure wave propagation may be induced along each of the elements substantially independently of the others and the elements are built together as a single mechanical structure. There are forms of slow wave structure in which a pattern of tape conductors is arranged in a plane between a pair of sidewalls vertical to that plane. Such an array of conductors is called, in the present specification, a grating. Regarding a grating as an element it is possible to build up a multi-element slow wave structure between a single pair of side walls with a plurality of gratings one above the other so that they may be flooded by a single electron beam passing between the side walls along the planes of the gratings. Although the planar grating made of thin tapes is probably the simplest form to visualize, it is to be understood that the gratings need not in fact be planar or necessarily constructed of thin tapes. They may be curved so as not to lie in the planes of their edges and may have considerable thickness.

One of the major difficulties in constructing a traveling wave tube using a multi-element slow wave structure of gratings is that of matching the several circuits to a common input or output waveguide or other form of wave feeder.

A still greater problem—perhaps the most formidable one encountered in the design of backward wave oscillator tubes for millimetric wavelengths—is the effect of thermal heating by the electron beam. This is liable to cause distortion of the grating conductors with its attendant mechanical and electrical difficulties.

In the present invention a multiple element slow wave structure of gratings is used in which the gratings are secured together and to the side walls at their opposite edges but are curved out of the planar form so that, at least in the middle, they are spaced apart, the conductors of each grating being arranged for propagation along that grating in a frequency band common to all the gratings. Since the gratings are already bent out of the plane, thermal heating will tend merely to alter the curvature to a comparatively minor extent, while, since the gratings merge into one another at their edges, if their wave propagation constants are nearly equal it becomes possible to couple all of them substantially in phase to a common feeder through one of their common junctions.

In the present invention the gratings may also be coupled to a length of coaxial transmission line whose outer conductor is continuous for radio frequency purposes with one of the side walls of the slow wave structure and whose inner conductor is continuous with the conductors of the gratings.

Embodiments of the invention will be described with reference to the accompanying drawings in which:

FIG. 1 is a perspective illustration of a portion of a slow wave structure according to the invention;

FIG. 2 illustrates a preferred method of coupling a wave feeder to a grating in the structure of FIG. 1;

FIG. 4 illustrates diagrammatically a backward wave oscillator according to the invention;

FIG. 5 illustrates a method of construction by means of which the curved shape of the gratings may be controlled;

Figure 3:
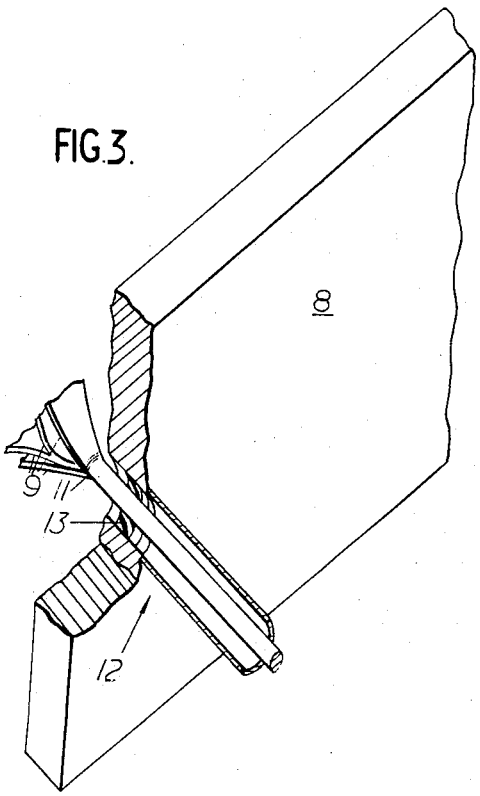
FIG. 3 is a more detailed view of the preferred method of coupling a wave feeder to a grating in the structure of FIG. 1.

In the embodiment of FIG. 1 each of the side walls is divided longitudinally into two parts. The lower parts 1, which for mechanical convenience are joined together at their bases by an integral cross member 2, are each provided with a longitudinal step 3 to receive the other part 4 of the side wall. Four gratings 5, each patterned as shown in FIG. 2 to provide a single zig-zag path 6 (FIG. 2), from end to end of the grating, is clamped at its opposite edges between the portions 1 and 4 of the side walls. Each of the gratings, which may be fabricated out of thin flat sheet material, is initially of greater width than the distance between the risers of the steps 3, so that it has to assume a curved form to seat against them. On being clamped against the heads of the steps by the side wall portions 4, the gratings assume curved forms such as shown in FIG. 1. The gratings are preferably made of molybdenum and the side walls of stainless steel. The assembly may be secured together either by means of clamps, not shown, or by one of the known copper or gold brazing processes. The individual gratings are arranged so that the middle portions of adjacent gratings are spaced apart from one another. Preferably the lower two gratings are curved oppositely to the upper pair, as shown in FIG. 1. The cross-member 2, joining the side wall portions 1, should be sufficiently far removed from the nearest grating to avoid interference with the propagation characteristics of the slow wave structure formed by this grating and the side walls. Similarly the side wall portions 4 should extend above the gratings sufficiently far for substantially the whole of the electromagnetic field of the slow wave structure to be contained between the side walls.

A good impedance match may readily be made to each of the gratings of FIG. 1 by the arrangement shown in FIG. 2. Here a grating 5 is illustrated extending between a pair of side walls 7 and 8. The grating is made up of parallel transverse conductors 9, joined at their ends to the respective side walls, and each joined to its adjacent transverse conductor by means of a longitudinal conductor 10. Alternate conductors 10 are positioned on opposite sides of the central axis between the side walls, so providing a single zig-zag path 6 from end to end of the grating between the side walls. At the end of the grating the transverse conductor 9', which extends from side wall 7 and is joined to a longitudinal conductor 10' which is one of those to the left of the axis of the structure, is bent out of the general pattern of the grating and, instead of being joined to the opposite side wall 8, is joined to the corresponding conductors of the other gratings and is continued through the side wall 8 as the inner conductor 11 of a length of coaxial transmission line 12 whose outer conductor is formed by the wall of an aperture 13 in the side wall. This aperture leads into a hollow waveguide 14, one wall of which is conveniently formed by the side wall 8, and which is short circuited at 15 approximately a quarter wavelength from the middle of aperture 13. The inner conductor 11 of the coaxial line section 12 is continued as probe 16 into the waveguide 14.

Referring to FIG. 3, it is more clearly shown how the ends of the respective conductors 9' are bent towards one another and are joined together and to a further conductor 11 in the neighborhood of where, if the gratings were not terminated at this transverse conductor, it would be joined to a further longitudinal conductor. The further conductor 11 is the inner conductor of a coaxial line 12 whose outer conductor is continuous with the side wall 8 at this side of the grating. The conductor 11 passes through the side wall, which provides a continuation of the outer conductor around inner conductor 11.

An insulating washer 13 supports the conductor 11 in its passage through the side wall. The conductors 9' are shown tapered down in which prior to joining the conductor 11 while the end of conductor 11 where it joins the grating conductors 9' is itself tapered down to match the thickness of the grating conductors. In order to provide the optimum position for the transition from the coaxial line to the grating a circular flange, not shown in FIG. 3, may be joined to the inner side of the side wall as a continuation of the outer conductor on the coaxial line, the flange being flared out, if necessary, to allow adequate clearace for the width of the conductors 9'.

A backward wave oscillator embodiment of the invention is illustrated diagrammatically in FIG. 4. The tube is built around a slow wave structure such as illustrated in FIG. 1 having a waveguide coupling thereto as illustrated in FIGS. 2 and 3. A plurality of gratings 5 are mounted between side walls 4, as in FIG. 1, and waveguide 14 is shown running along and to one side of the slow wave structure and coupled thereto by a coaxial line connection 12 as in FIG. 2. An electron beam is projected from a gun represented diagrammatically at 17 and flows along the axis of the slow wave structure so as to flood all the gratings 5. The beam is collected at an electron collector electrode 18. The beam is maintained parallel by means of an axial magnetic field indicated by the arrow H. The oscillator tube is housed in a metal envelope 19 closed at one end by the electron collector 18, through which is led out the waveguide 14, and, at the other end, by a base member 20 through which are taken the potential leads to the electron gun electrodes. The waveguide 14 is shown terminated in a flange 21. For vacuum purposes a waveguide window may be incorporated in the flange 21 or it may be arranged that a hermetic seal is incorporated in the coaxial line 12 as indicated in FIG. 2 by the insulating collar 22.

The natural curvature of the gratings as depicted in FIG. 1 is well suited for interaction of the field of the gratings with a solid cvylindrical beam. Since, however, most of the interaction will occur in the neighborhood of the beam axis, it is advantageous to control the curvature of the gratings to make them conform more to the contour of the electron beam. Increased curvature in the metal portions of the gratings may readily be obtained by the constructional arrangement illustrated diagrammatically for two gratings in FIG. 5. Here the gratings 23 are formed of conductors which are thicker at their ends adjacent the side walls than in the middle, as indicated at 24 and 25 respectively. The curvature will obviously tend to be increased over the thinner portions of the structure and to be a minimum at the side walls.

In the case where a slow wave structure according to the invention employs more than one grating on each side of the plane containing the longitudinal edges of the gratings, it will be evident that, in order that the central portions of the gratings may be spaced apart, when laid flat the gratings will be of a different width. It follows that, in general, the propagation constants of the individual gratings will not be identical. The change of phase velocity of the wave propagated along each grating does not, however, vary in proportion to the flat width of the grating but is less than the change from grating to grating of the flat width. It follows, therefore, that in spite of small differences in phase velocity between individual gratings, it is possible to obtain a worth-while contribution to the interaction with a single electron beam with such slightly different gratings. In the embodiment of FIG. 1 four gratings are shown; it is considered that the number of gratings could be usefully increased to six in the case of backward wave oscillators such as described with reference to FIG. 4.

It is not essential, in certain embodiments of the invention, that the propagation constants of the individual gratings should be similar. It is possible to provide gratings having patterns such that certain gratings provide backward wave interaction while other gratings along the same beam path have forward mode characteristics. In the present invention arrangements of gratings can be made with a provision of means such as damping by means of lossy coatings, to provide a reflectionless termination for gratings propagating in the backward mode and to lead out separately the forward and backward propagating sets of gratings.

By way of example of typical dimensions for a slow wave structure according to the present invention, a structure such as that of FIG. 1 for use in a backward wave oscillator at 12K Mc./s. has:

| | Mm. |
|---|---|
| Side wall spacing (W) | 15 |
| Pitch | 1.25 |
| $A_1$ (central rise) | 1 |

A spacing of 15 mm. between side walls, the pitch of the grating—i..e center to center of adjacent transverse conductors—is 1.25 mm. and the outermost grating rises 1 mm. out of the plane of the longitudinal edges of the grating.

Although, in the foregoing embodiments, it has been assumed that each of the gratings is of the pattern shown in FIG. 2, other patterns of grating will be discussed hereinbelow which may also be utilized.

Figure 6:
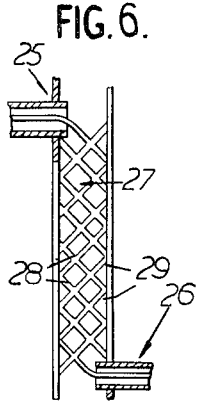
FIG. 6 shows a plan view of an arrangement according to the invention for coupling to a slow wave structure of a different grating pattern.

In the embodiment of FIG. 6 a different grating pattern is shown and the gratings are illustrated coupled to coaxial lines 25 and 26, respectively, at their ends in a manner shown in FIGS. 2 and 3. The coaxial lines may, as shown, project through the side walls with the outer conductor continuing a short distance beyond the inner edge of the respective side walls towards the central axis so as to place the transition from slow wave structure to coaxial line in its most favorable position.

Figure 7:
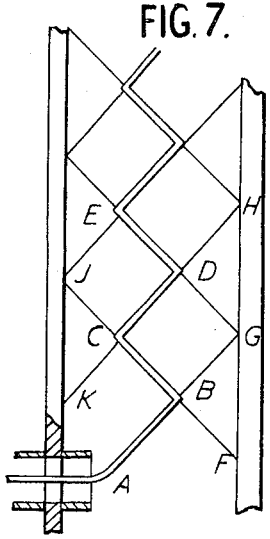
FIG. 7 is a sketch illustrating the formation of the zig-zag conducting path in the grating of FIG. 6.

In each grating 27 two sets of transverse conductors 28 and 29, oppositely inclined to the side walls replace the transverse and longitudinal conductors as shown in FIGS. 1 and 2. The conductors 28 and 29 thus form a lattice pattern of diamonds. The zig-zag path referred to previously can, perhaps, be seen more clearly from the illustration of FIG. 7, in which the zig-zag path is indicated in thick lines A, B, C, D, E, and the remaining portions of the grating conductors are indicated by the thin lines FB, BG, GD, DH, EJ, CJ and CK. But for the termination of the grating there would be a conductor AK. This conductor is omitted, however, and at A the path CBA continues into the coaxial line.

Figure 8:
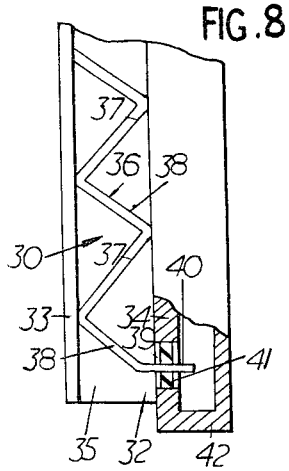
FIG. 8 is a plan view of a slow wave structure coupled to a hollow waveguide.

In the embodiment of FIG. 8, coupling means is shown between a single slow wave structure 30 and a rectangular waveguide 31 by means of a length of coaxial transmission line 32. The slow wave structure 30 comprises side walls 33 and 34 joined together for mechanical convenience by a base member 35. The grating 36 is mounted between the side walls sufficiently far above the base member 35 so that the latter does not interfere with the wave propagation. The side walls extend above the grating on the opposite side sufficiently far to ensure that substantially all the field of the slow wave structure is contained between the side walls. The grating in this embodiment is that of two sets of transverse conductors 37 and 38, respectively, the conductors of each set being oppositely inclined to the side walls so as to form a pattern which, comparing with FIGS. 6 and 7, may be called a half-diamond pattern. The waveguide 31 has one broad side formed by the side wall 34. At the end of the grating the conductor 38 where it would normally be joined to the side wall 34 is, instead, extended as indicated at 40 and taken through an aperture 39 in this side wall. The extension 40 of conductor 38 forms with the wall of aperture 39 a length of coaxial transmission line. An insulating washer 41 is shown supporting the extension 40 within the aperture. The waveguide 31 is short-circuited, as indicated at 42, a distance approximately a quarter wave-length from the aperture 39. The extension 40 projects through aperture 39 into waveguide 31 and there behaves as a coaxial line to wave-guide coupling probe.

In the embodiments of FIGS. 6 and 8, the slow wave structures are illustrated as each having only one grating. Modifications of these embodiments each having a plurality of gratings may be coupled together to a common wave feeder in analogous manner to that shown in FIGS. 1 and 3.

Figure 9:
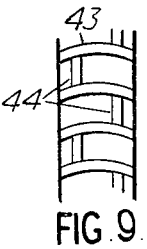
FIG. 9 is a plan view of an alternative type of slow wave structure.
Figure 10:
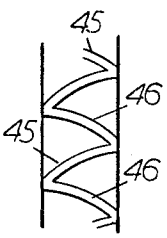
FIG. 10 is a plan diagram of another form of grating according to the invention.

Another type of slow wave structure for use in a backward wave oscillator tube such as that of FIG. 4 is illustrated schematically in FIGS. 9 and 10.

In the embodiment of FIGS. 9 and 10 the slow wave structures are, unlike the structures shown in the previous figures, maintained in a flat plane, but the transverse conductors are formed as bars each having a thickness normal to the plane of the grating greater than its width measured along the axis of the slow wave structure and each bowed out along the axis in the plane of the grating. The grating thus remains flat in spite of distortion of the conductors due to thermal expansion.

Referring now to the embodiment of the invention illustrated in FIGS. 9 and 10, the arrangement is shown which may be employed in an oscillator similar to that of FIG. 4. In place of the curved ribbon type structure shown in FIGS. 1 and 5, bars are used, each curved in the plane of the grating as shown and each having a thickness greater than its width, so that thermal expansion will tend to increase the curvature of the bars in the plane of the slow wave structure without distortion normal to that plane. In FIG. 9 the transverse conductors 43 which are curved in the plane of the grating are relatively thick bars as compared with thin tapes. The longitudinal conductors 44 are of the same thickness as the bars 43 and are preferably integral with them.

Other types of flat slow wave structure are also suitable as embodiments of the invention; in FIG. 10 one set of transverse conductors 45, generally oblique to the side walls, are joined at their junctions with the side walls to respective members of a similar set of transverse conductors 46 which are oppositely inclined to the side walls so forming a pattern of half-diamonds. Each conductor 45, 46 is curved in the plane of the grating.

As has been mentioned, flat gratings of the general kind illustrated have previously been preferably made of thin material such as tapes. This provides a more effective interaction between the electron beam and the electromagnetic field of the structure than do relatively thick bars, quite apart from the question of beam interception; on the other hand, at millimeter wavelengths the dominant problem is to reduce losses and to increase the maximum permissible thermal dissipation of the structure. One solution, described hereinabove to mount the thin tapes such that they do not lie in a flat plane. However, if a flat plane is employed, as shown in FIGS. 9 and 10, the conductors may be relatively thick. The greater surface area over which high frequency currents may flow with the bar structures, together with the simple provision for increased thermal dissipation, more than offsets the loss of efficiency in beam interaction due to the thickness.

Slow wave structures according to the FIGS. 9 and 10 may be made from relatively thick sheet material by a spark-machining process. This process is illustrated very diagrammatically in FIG. 11; a sheet of material 47 is supported, by means not shown, in a tank 48 and submerged in a suitable oil 49, a tool 50, shaped to conform to the required cut-outs, but of slightly smaller cross-sectional area, is held in position opposite that part of the surface where the cut-out is desired. The sheet 47 is shown connected to the wall of the tank 48 by means of lead 51 and leads 52 and 53 from the wall of the tank and from the spark tool 50 are connected to a source of potential 54. The spark tool 50 may be of hardened steel although we have used copper where ease of fabrication is more important than the life of the tool. Sparking between the tool surfaces and the sheet 47 erodes away the surface of the latter so that the tool may be gradually lowered until penetration is effected. If the voltage of the source 54 is adjusted to provide a given sparking distance between tool 50 and an adjacent conductor within the oil-filling 49 of the tank, then, as soon as spark-erosion has worn away this clearance, sparking ceases. This means that clean sharp holes may be cut without any undercutting or burrs.

Figure 12:
Figure 13:
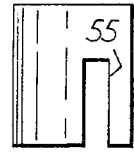

For the manufacture of a grating such as that of FIG. 9, the tool 50 may be of the form illustrated in FIGS. 12 and 13. The tool is generally curved, as shown in FIG. 12, to correspond to the curvature of the transverse bars 43 of FIG. 9. A slot 55 is cut into the tool so as to provide for the longitudinal bars 44. When a pair of apertures has been cut in the sheet 47 by means of the tool 50, the tool is replaced by a similar one in which the slot is on the opposite side of the axis and the second tool and the sheet are moved relatively to one another in position for cutting the next pair of apertures.

Figure 11:
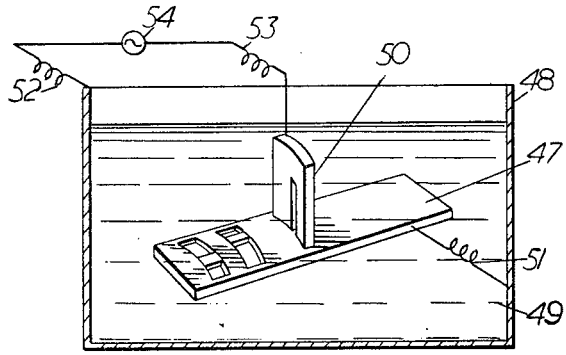
FIG. 11 illustrates the preferred method of manufacture of the slow wave structure of FIGS. 9 and 10, and FIGS. 12 and 13 are, respectively, plan and front elevational views of the spark cutting tool used in the method of FIG. 11.

The resulting structure may be fixed to its side walls by means of simple compression seals which do not require brazing. In the sketch of FIG. 11 the apertures are shown not extending to the full width of the sheet 47 so as to leave a thin edge portion for joining to the side walls; if desired the apertures can extend to the full width of the sheet.

While I have described above the principles of my invention in connection with specific apparatus, it is to be clearly understood that this descrpition is made only by way of example and not as a limitation to the scope of my invention as set forth in the accompanying claims.

I claim:

1. A traveling wave tube including a slow wave structure disposed about a given axis, electron gun means for projecting an electron beam along the said axis, means providing an axial magnetic field, and means for collecting said electron beam, the slow wave structure including a pair of conducting side walls containing between them substantially the whole of the electromagnetic field of the structure and a plurality of interaction members joined along their opposite longitudinal edges to both side walls and symmetrically spaced about opposite sides of said axis and enclosing said beam therebetween, each of said members having a plurality of curved conductors connected transversely between said walls and being arranged to provide axial wave propagation characteristics over a given band of frequencies, such that the field of each member interacts with the electron beam.

2. A traveling wave tube including a slow wave structure disposed about a given axis, electron gun means for projecting an electron beam along the said axis, means providing an axial magnetic field, and means collecting said electron beam, the slow wave structure including a pair of conducting side walls containing between them substantially the whole of the electromagnetic field of the structure and a plurality of gratings each joined at their opposite longitudinal edges to both side walls and to one another along a plane containing the electron beam axis and symmetrically spaced about opposite sides of said axis and enclosing said beam therebetween, the gratings being curved in a transverse plane around the electron beam axis so as to leave a space between each two adjacent gratings, said gratings being formed of conductors arranged to provide axial wave propagation characteristics over a given band of frequencies, such that the field of each grating interacts with the electron beam.

3. A traveling wave tube according to claim 2 including a common radio frequency connection to each grating for coupling to an external source or load.

4. A traveling wave tube according to claim 2 in which each side wall is arranged to receive and clamp the edges of the gratings together.

5. A traveling wave tube according to claim 2 in which each grating is rigidly secured to each side wall and the thickness of the grating is tapered from the side walls to the middle to control thermal expansion.

6. A traveling wave tube according to claim 2 in which the conductors in each grating form a single zig-zag conducting path from end to end of the grating symmetrically disposed about the beam axis.

7. A traveling wave tube according to claim 6 in which the pattern of conductors in each grating is such as to provide for wave propagation over the given range of frequencies in a backward mode, the tube being arranged as backward wave oscillator.

8. A traveling wave tube according to claim 6 in which a transverse conductor at an end of each grating is joined to the corresponding transverse conductor of each other grating, a common conductor is connected to said end conductors and through an aperture in the side wall of the slow wave structure and a wave feeder is connected to a common conductor, the common conductor and the side wall surrounding it being dimensioned to provide an impedance matching length of coaxial transmission line.

9. A traveling wave tube according to claim 8 in which the said common conductor projects as a probe into a hollow waveguide feeder.

10. A slow wave structure according to claim 1 including a flat grating of conductors extending symmetrically about a given axis between and connected to the side walls in which the grating includes a succession of transverse bars curved in the plane of the grating and spaced apart along the axis, the thickness of each bar, normal to the plane of the grating, being not less than its width measured along the axis.

11. A slow wave structure according to claim 10 in which the grating includes longitudinal bars each joined between consecutive transverse bars to form a zig-zag conducting path from end to end of the grating.

12. A slow wave structure according to claim 11 in which the grating is formed integrally of sheet metal.

References Cited by the Examiner

UNITED STATES PATENTS

| 2,687,777 | 8/1954 | Warnecke et al. | 315—3.6 |
| 2,841,686 | 7/1958 | Williams | 216—69 |
| 2,999,959 | 9/1961 | Kluver | 315—3.6 |
| 3,043,984 | 7/1962 | Stephenson | 315—3.6 |
| 3,058,025 | 10/1962 | Hogg | 315—3.6 |
| 3,181,090 | 4/1965 | Ash | 333—31 |

HERMAN KARL SAALBACH, *Primary Examiner.*

JOHN W. HUCKERT, *Examiner.*

S. CHATMON, JR., *Assistant Examiner.*